United States Patent
Inudo et al.

(10) Patent No.: US 12,281,623 B2
(45) Date of Patent: Apr. 22, 2025

(54) DRIVE CONTROL SYSTEM

(71) Applicant: SUBARU CORPORATION, Tokyo (JP)

(72) Inventors: Shota Inudo, Tokyo (JP); Yuji Ohori, Tokyo (JP); Dai Okiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/366,807

(22) Filed: Aug. 8, 2023

(65) Prior Publication Data

US 2024/0077041 A1  Mar. 7, 2024

(30) Foreign Application Priority Data

Sep. 1, 2022  (JP) .................................. 2022-139360

(51) Int. Cl.
*F02D 41/00* (2006.01)
*F02M 35/10* (2006.01)

(52) U.S. Cl.
CPC ... *F02D 41/0007* (2013.01); *F02M 35/10157* (2013.01); *F02D 2200/04* (2013.01); *F02D 2200/1002* (2013.01)

(58) Field of Classification Search
CPC .......... F02M 35/10157; F02D 2200/04; F02D 2200/1002; F02D 41/0007; F02D 41/009; F02D 41/042
See application file for complete search history.

(56) References Cited

U.S. PATENT DOCUMENTS

| | | | | |
|---|---|---|---|---|
| 4,756,377 A | * | 7/1988 | Kawamura | F02D 41/0007 180/65.245 |
| 9,878,682 B2 | * | 1/2018 | Pierce | H02J 7/342 |
| 9,893,545 B2 | * | 2/2018 | Bean | H02J 7/007 |
| 10,731,587 B2 | * | 8/2020 | Martin | F02B 39/10 |
| 11,536,211 B2 | * | 12/2022 | Hotta | F02B 75/20 |
| 11,629,659 B2 | * | 4/2023 | Banker | F02B 37/10 123/294 |
| 2005/0228575 A1 | * | 10/2005 | Murakami | F02D 41/065 701/112 |
| 2010/0036591 A1 | * | 2/2010 | Nakai | F02D 41/042 701/112 |

(Continued)

FOREIGN PATENT DOCUMENTS

JP  2018-76811 A  5/2018

*Primary Examiner* — Carl C Staubach
(74) *Attorney, Agent, or Firm* — Rimon P.C.

(57) ABSTRACT

A drive control system includes an engine, an electric turbocharger, and a controller. The engine includes a cylinder and a piston provided in a slidable manner inside the cylinder and rotates a crankshaft in accordance with sliding of the piston. The electric turbocharger supplies compressed air into the cylinder. The controller controls the engine and the electric turbocharger. The controller includes at least one processor and at least one memory coupled to the processor. The processor transmits a stoppage signal for stopping the engine to the engine, and stops the piston at a position where a crank angle is within a predetermined range from 60° before a top dead center to 30° before the top dead center by causing the electric turbocharger to supply the compressed air into the cylinder in a period from when the stoppage signal is transmitted to when stopping the engine is completed.

7 Claims, 7 Drawing Sheets

| | | OIL TEMPERATURE [°C] | | | |
|---|---|---|---|---|---|
| | | 0 | 20 | 90 | ... |
| ENGINE ROTATION SPEED [rpm] | 600 | TURBOCHARGING START TIMING * * * | TURBOCHARGING START TIMING * * * | TURBOCHARGING START TIMING * * * | ... |
| | | TURBOCHARGING DURATION * * * | TURBOCHARGING DURATION * * * | TURBOCHARGING DURATION * * * | ... |
| | | OUTPUT OF ELECTRIC TURBOCHARGER * * * | OUTPUT OF ELECTRIC TURBOCHARGER * * * | OUTPUT OF ELECTRIC TURBOCHARGER * * * | ... |
| | 800 | TURBOCHARGING START TIMING * * * | TURBOCHARGING START TIMING * * * | TURBOCHARGING START TIMING * * * | ... |
| | | TURBOCHARGING DURATION * * * | TURBOCHARGING DURATION * * * | TURBOCHARGING DURATION * * * | ... |
| | | OUTPUT OF ELECTRIC TURBOCHARGER * * * | OUTPUT OF ELECTRIC TURBOCHARGER * * * | OUTPUT OF ELECTRIC TURBOCHARGER * * * | ... |
| | 1200 | TURBOCHARGING START TIMING * * * | TURBOCHARGING START TIMING * * * | TURBOCHARGING START TIMING * * * | ... |
| | | TURBOCHARGING DURATION * * * | TURBOCHARGING DURATION * * * | TURBOCHARGING DURATION * * * | ... |
| | | OUTPUT OF ELECTRIC TURBOCHARGER * * * | OUTPUT OF ELECTRIC TURBOCHARGER * * * | OUTPUT OF ELECTRIC TURBOCHARGER * * * | ... |
| | ⋮ | ⋮ | ⋮ | ⋮ | ⋮ |

(56) References Cited

U.S. PATENT DOCUMENTS

| | | | | |
|---|---|---|---|---|
| 2012/0116653 A1* | 5/2012 | Hozumi | ............... | F02D 17/04 |
| | | | | 701/103 |
| 2015/0059688 A1* | 3/2015 | Kojima | ............... | F02D 37/02 |
| | | | | 123/305 |
| 2015/0188360 A1* | 7/2015 | Doane | ............ | H02J 7/35 |
| | | | | 307/29 |
| 2017/0130644 A1* | 5/2017 | Keim | .............. | F02B 37/10 |
| 2019/0316538 A1* | 10/2019 | Martin | ............... | F01N 13/10 |

* cited by examiner

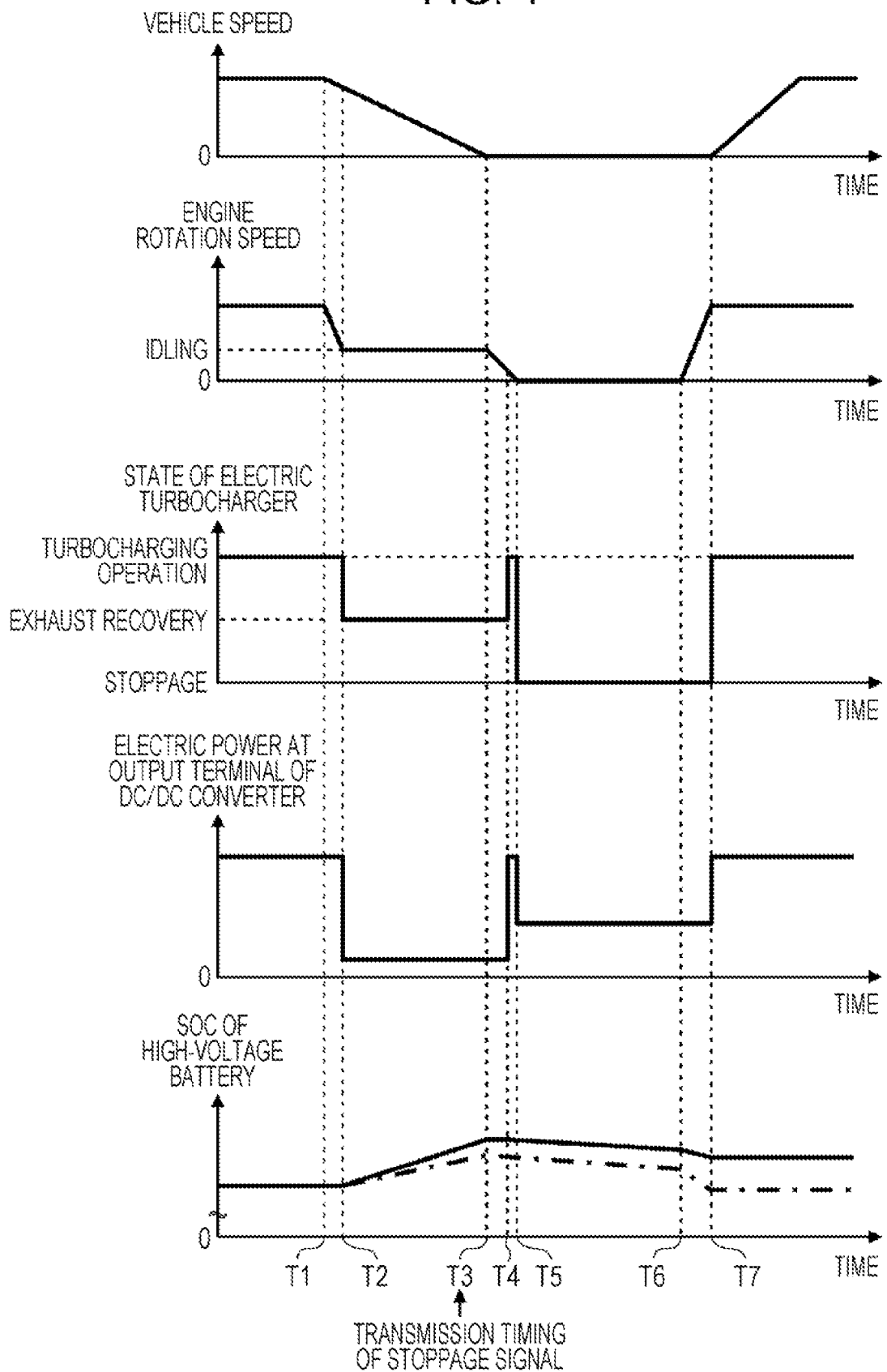

FIG. 5

| ENGINE ROTATION SPEED [rpm] | OIL TEMPERATURE [°C] | | | |
|---|---|---|---|---|
| | 0 | 20 | 90 | ... |
| 600 | TURBOCHARGING START TIMING *** <br> TURBOCHARGING DURATION *** <br> OUTPUT OF ELECTRIC TURBOCHARGER *** | TURBOCHARGING START TIMING *** <br> TURBOCHARGING DURATION *** <br> OUTPUT OF ELECTRIC TURBOCHARGER *** | TURBOCHARGING START TIMING *** <br> TURBOCHARGING DURATION *** <br> OUTPUT OF ELECTRIC TURBOCHARGER *** | ... |
| 800 | TURBOCHARGING START TIMING *** <br> TURBOCHARGING DURATION *** <br> OUTPUT OF ELECTRIC TURBOCHARGER *** | TURBOCHARGING START TIMING *** <br> TURBOCHARGING DURATION *** <br> OUTPUT OF ELECTRIC TURBOCHARGER *** | TURBOCHARGING START TIMING *** <br> TURBOCHARGING DURATION *** <br> OUTPUT OF ELECTRIC TURBOCHARGER *** | ... |
| 1200 | TURBOCHARGING START TIMING *** <br> TURBOCHARGING DURATION *** <br> OUTPUT OF ELECTRIC TURBOCHARGER *** | TURBOCHARGING START TIMING *** <br> TURBOCHARGING DURATION *** <br> OUTPUT OF ELECTRIC TURBOCHARGER *** | TURBOCHARGING START TIMING *** <br> TURBOCHARGING DURATION *** <br> OUTPUT OF ELECTRIC TURBOCHARGER *** | ... |
| ... | ... | ... | ... | ... |

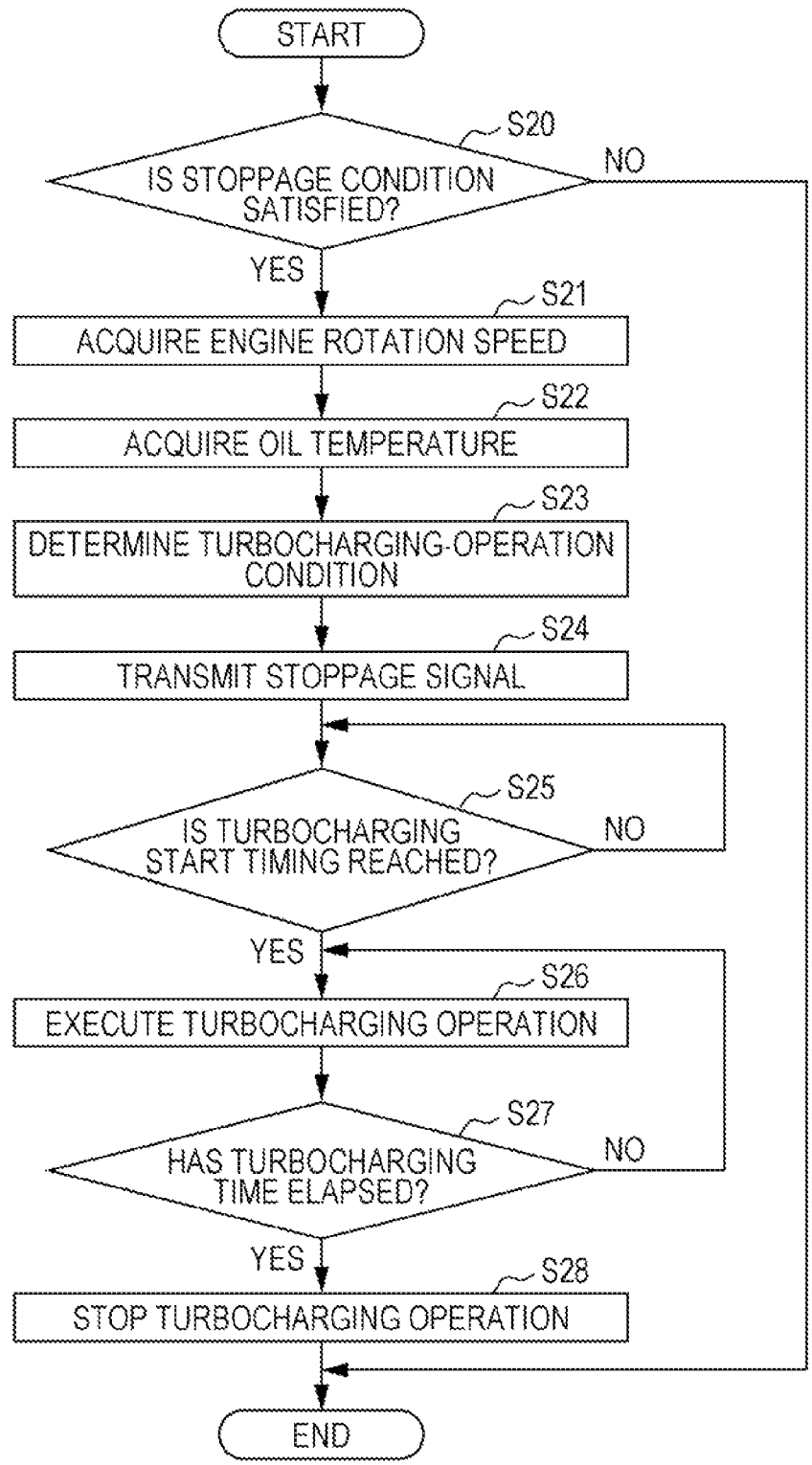

DRIVE CONTROL SYSTEM

CROSS-REFERENCE TO RELATED APPLICATIONS

The present application claims priority from Japanese Patent Application No. 2022-139360 filed on Sep. 1, 2022, the entire contents of which are hereby incorporated by reference.

BACKGROUND

The disclosure relates to drive control systems.

For example, Japanese Unexamined Patent Application Publication (JP-A) 2018-76811 discloses a technology in which, if a piston is not located at an appropriate position when an engine is to be started, the engine is started after driving a crankshaft by using a motor generator and positionally moving the piston to an appropriate position.

SUMMARY

An aspect of the disclosure provides a drive control system. The drive control system includes an engine, an electric turbocharger, and a controller. The engine includes a cylinder and a piston provided in a slidable manner inside the cylinder, and is configured to rotate a crankshaft in accordance with sliding of the piston. The electric turbocharger is configured to supply compressed air into the cylinder. The controller is configured to control the engine and the electric turbocharger. The controller includes at least one processor and at least one memory coupled to the at least one processor. The at least one processor is configured to execute a process including transmitting a stoppage signal for stopping the engine to the engine, and stopping the piston at a position where a crank angle is within a predetermined range from 60° before a top dead center to 30° before the top dead center by causing the electric turbocharger to supply the compressed air into the cylinder in a period from when the stoppage signal is transmitted to when stopping the engine is completed.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 4 is a timing chart explaining the flow of operation involving stopping and starting the engine;

FIG. 5 illustrates an example of a turbocharging-operation condition map;

FIG. 7 is a flowchart explaining the flow of operation performed by an engine-stoppage controller.

DETAILED DESCRIPTION

In the technology according to JP-A 2018-76811, the piston in a stopped state is moved to an appropriate position by using the motor generator, so that a relatively large amount of electric power is consumed when moving the piston. Therefore, the technology according to JP-A 2018-76811 leads to an increase in power consumption for starting the engine, including the electric power consumed for moving the piston.

It is desirable to provide a drive control system that can reduce power consumption for starting an engine.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
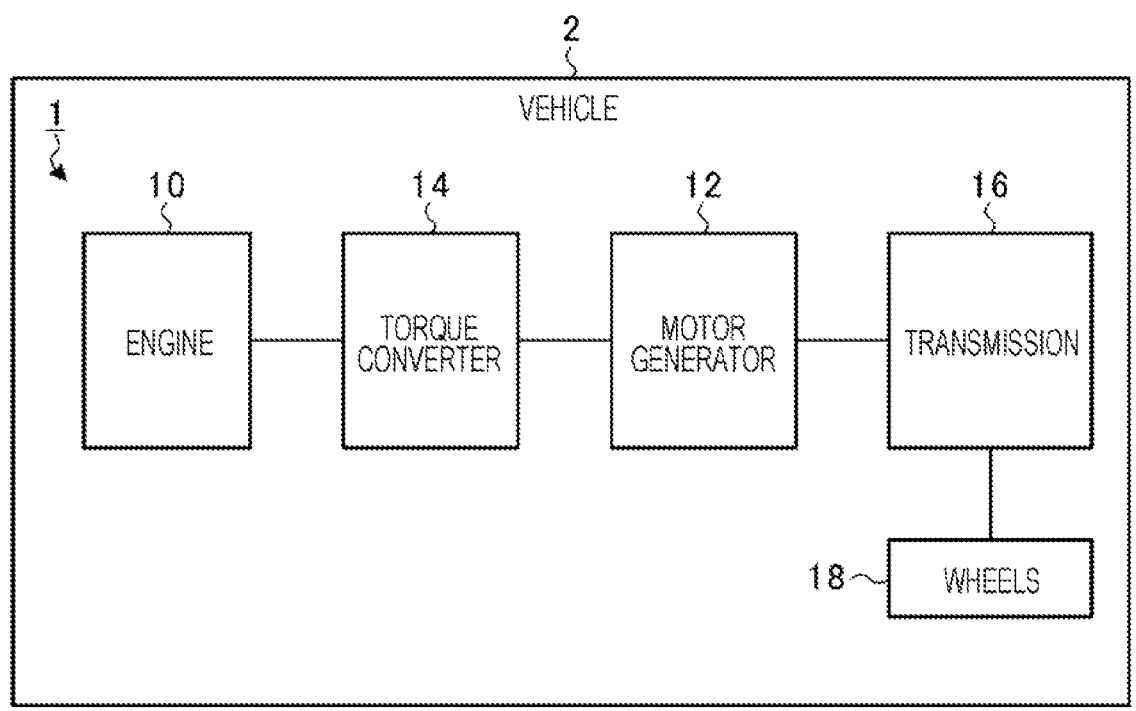
FIG. 1 schematically illustrates the configuration of a vehicle to which a drive control system according to an embodiment is applied.

FIG. 1 schematically illustrates the configuration of a vehicle 2 to which a drive control system 1 according to this embodiment is applied. The vehicle 2 includes an engine 10, a motor generator 12, a torque converter 14, a transmission 16, and wheels 18. The vehicle 2 is a hybrid electric automobile equipped with the engine 10 and the motor generator 12 as driving sources. Alternatively, the vehicle 2 may be an engine vehicle equipped with the engine 10 as a driving source without being equipped with the motor generator 12.

The engine 10 is coupled to the torque converter 14. The torque converter 14 is coupled to the motor generator 12. The motor generator 12 is coupled to the transmission 16. The transmission 16 is coupled to the wheels 18.

A driving force of the engine 10 is transmitted to the wheels 18 via the torque converter 14, the motor generator 12, and the transmission 16. A driving force of the motor generator 12 is transmitted to the wheels 18 via the transmission 16. If the load of the wheels 18 is greater than the output of the motor generator 12, the motor generator 12 may serve as an electric generator that generates electricity in accordance with rotation of the wheels 18. The motor generator 12 may also serve as a starter that starts the engine 10.

Figure 2:
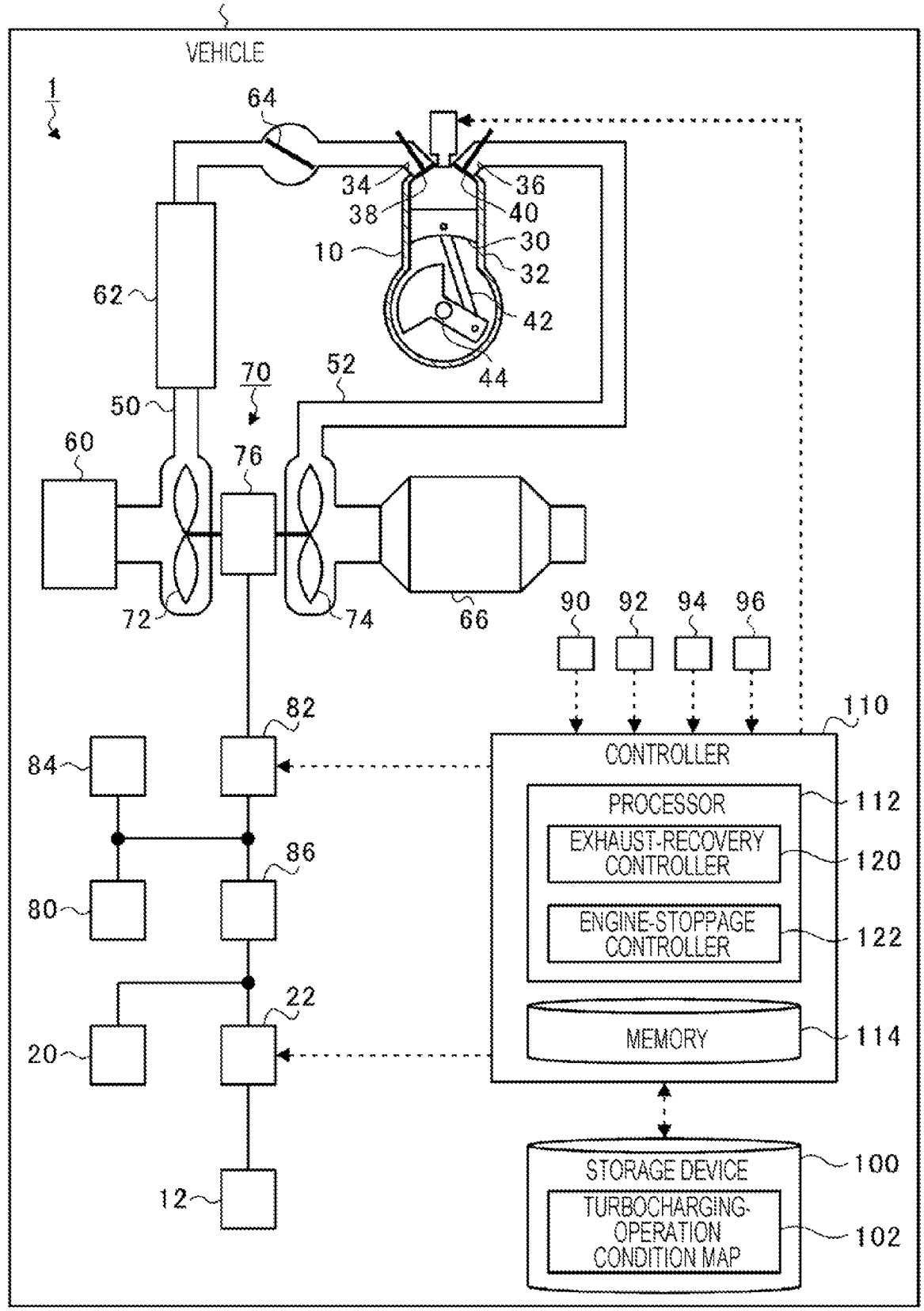
FIG. 2 is a detailed diagram illustrating the configuration of the vehicle to which the drive control system according to the embodiment is applied.

FIG. 2 is a detailed diagram illustrating the configuration of the vehicle 2 to which the drive control system 1 according to this embodiment is applied. The vehicle 2 includes a high-voltage battery 20 that supplies electric power to the motor generator 12. The high-voltage battery 20 is, for example, a rechargeable-dischargeable secondary battery, such as a lithium-ion battery.

The motor generator 12 is electrically coupled to the high-voltage battery 20 with a high-voltage inverter 22 interposed therebetween. The motor generator 12 rotates in accordance with the electric power supplied from the high-voltage battery 20. When the motor generator 12 serves as an electric generator, the motor generator 12 supplies the generated electric power to the high-voltage battery 20 so as to recharge the high-voltage battery 20.

The engine 10 includes a piston 30, a cylinder 32, an intake port 34, an exhaust port 36, an intake valve 38, and an exhaust valve 40. The piston 30 is accommodated in a slidable manner inside the cylinder 32. The intake port 34 and the exhaust port 36 communicate with the interior of the cylinder 32. The intake valve 38 opens and closes the intake port 34. The exhaust valve 40 opens and closes the exhaust port 36.

When the intake valve 38 is opened, air is delivered into the cylinder 32 via the intake port 34. Moreover, fuel is injected into the cylinder 32. In the cylinder 32, a mixture of the air and the fuel is combusted, so that the piston 30 slides inside the cylinder 32. The piston 30 is coupled to a crankshaft 44 by a coupling rod 42. The crankshaft 44 is coupled to the torque converter 14. When the piston 30 slides, the crankshaft 44 rotates. In other words, the engine 10 rotates the crankshaft 44 in accordance with the sliding of the piston 30.

When the exhaust valve 40 is opened, the gas inside the cylinder 32 is discharged outward from the cylinder 32 via the exhaust port 36.

The vehicle 2 includes an intake channel 50 and an exhaust channel 52. The intake channel 50 is coupled to the intake port 34. The air delivered into the cylinder 32 via the intake port 34 flows through the intake channel 50. The exhaust channel 52 is coupled to the exhaust port 36. The gas discharged outward from the cylinder 32 via the exhaust port 36 flows through the exhaust channel 52.

The intake channel 50 is provided with an air cleaner 60, an intercooler 62, and a throttle valve 64 in that order in the flowing direction of the air. The air cleaner 60 removes foreign matter from the air taken into the intake channel 50. The intercooler 62 cools the air flowing through the intake channel 50. The throttle valve 64 adjusts the amount of air delivered into the cylinder 32 in accordance with an acceleration operation performed by a driver who drives the vehicle 2.

The exhaust channel 52 is provided with a catalyst 66. The catalyst 66 is, for example, a three-way catalyst and purifies the gas discharged from the cylinder 32.

The vehicle 2 includes an electric turbocharger 70. The electric turbocharger 70 includes an intake turbine 72, an exhaust turbine 74, and a turbocharger motor 76. The intake turbine 72 is provided in the intake channel 50 and is located between the air cleaner 60 and the intercooler 62 in the intake channel 50. The exhaust turbine 74 is provided in the exhaust channel 52 and is located between the exhaust port 36 and the catalyst 66 in the exhaust channel 52. The exhaust turbine 74 rotates as a result of gas flowing through the exhaust channel 52. The turbocharger motor 76 is coupled to the intake turbine 72 and the exhaust turbine 74.

The vehicle 2 includes a low-voltage battery 80. The low-voltage battery 80 is, for example, a rechargeable-dischargeable secondary battery, such as a lead storage battery. The voltage of the low-voltage battery 80 is, for example, 12 V and is lower than the voltage of the high-voltage battery 20.

The low-voltage battery 80 is electrically coupled to a low-voltage inverter 82, an electrical device 84, and a DC/DC converter 86. The low-voltage battery 80 is electrically coupled to the turbocharger motor 76 with the low-voltage inverter 82 interposed therebetween. The low-voltage battery 80 can supply electric power to the turbocharger motor 76 via the low-voltage inverter 82.

The electrical device 84 may include various types of electric and electronic devices, such as an air conditioner and a navigation device, equipped in the vehicle 2 and operating at low voltage. The low-voltage battery 80 can supply electric power to the electrical device 84.

An input terminal of the DC/DC converter 86 is electrically coupled to the high-voltage battery 20 and the high-voltage inverter 22. In other words, the input terminal of the DC/DC converter 86 is coupled to a high-voltage electrical system serving as high-voltage electrical wiring. An output terminal of the DC/DC converter 86 is electrically coupled to the low-voltage battery 80, the low-voltage inverter 82, and the electrical device 84. In other words, the output terminal of the DC/DC converter 86 is coupled to a low-voltage electrical system serving as low-voltage electrical wiring.

The DC/DC converter 86 converts electric power of the high-voltage electrical system at the input terminal into electric power of the low-voltage electrical system at the output terminal, and outputs the electric power from the output terminal. Accordingly, for example, the electric power of the high-voltage battery 20 can be supplied to the low-voltage battery 80, the electrical device 84, and the turbocharger motor 76 via the DC/DC converter 86.

The turbocharger motor 76 consumes the electric power supplied via the low-voltage inverter 82 to drive the intake turbine 72. Furthermore, in the electric turbocharger 70, the intake turbine 72 can also be driven in accordance with rotation of the exhaust turbine 74.

The turbocharger motor 76 drives the intake turbine 72 to compress the air taken into the intake channel 50 via the air cleaner 60, so as to generate compressed air. The compressed air is delivered into the cylinder 32 via the intercooler 62, the throttle valve 64, and the intake port 34. In other words, the electric turbocharger 70 is configured to generate compressed air and deliver the generated compressed air into the cylinder 32. The operation involving driving the intake turbine 72 to generate the compressed air may sometimes be referred to as "turbocharging operation" hereinafter.

The turbocharger motor 76 may also serve as an electric generator that generates electricity in accordance with rotation of the exhaust turbine 74. The turbocharger motor 76 serves as an electric generator so as to be capable of converting rotational energy of the exhaust turbine 74 into electrical energy. The electric power generated by the turbocharger motor 76 is supplied to the low-voltage battery 80 via the low-voltage inverter 82. Recovery operation involving converting the rotational energy of the exhaust turbine 74 into electrical energy may sometimes be referred to as "exhaust recovery" hereinafter.

Accordingly, the turbocharger motor 76 is capable of executing turbocharging operation in addition to exhaust recovery. The turbocharging operation and the exhaust recovery are switchable depending on the situation.

The vehicle 2 includes an accelerator-pedal sensor 90, an engine-rotation-speed sensor 92, a crank-angle sensor 94, and an oil-temperature sensor 96. The accelerator-pedal sensor 90 detects an accelerator operational amount by which the accelerator pedal is operated by the driver. The engine-rotation-speed sensor 92 detects an engine rotation speed as the rotation speed of the engine 10. The crank-angle sensor 94 detects a crank angle as the rotational angle of the crankshaft 44. The oil-temperature sensor 96 detects an oil temperature as the temperature of lubricating oil of the engine 10.

The vehicle 2 includes a storage device 100. The storage device 100 is a nonvolatile storage element. The nonvolatile storage element may include, for example, an electrically readable-writable nonvolatile element, such as a flash memory. A turbocharging-operation condition map 102 is preliminarily stored in the storage device 100. The turbocharging-operation condition map 102 will be described in detail later.

The vehicle 2 includes a controller 110. The controller 110 includes at least one processor 112 and at least one memory 114 coupled to the processor 112. The memory 114 includes a read-only memory (ROM) storing a program and a random access memory (RAM) serving as a work area. The processor 112 controls the entire vehicle 2 by executing the program. For example, the controller 110 controls the engine 10 and the electric turbocharger 70.

The processor 112 also serves as an exhaust-recovery controller 120 and an engine-stoppage controller 122 by executing the program. The exhaust-recovery controller 120 causes the turbocharger motor 76 to execute exhaust recovery while the engine 10 is idling.

The engine-stoppage controller 122 transmits, to the engine 10, a stoppage signal for stopping the engine 10 when a predetermined stoppage condition for stopping the engine 10 is satisfied. For example, when the engine-stoppage controller 122 receives an input operation for turning off the ignition from the driver, the engine-stoppage controller 122 may determine that the predetermined stoppage condition is satisfied. The predetermined stoppage condition may be the same as a condition for executing an idling stop mode.

The engine 10 having received the stoppage signal stops the fuel injection and the ignition. As a result, the combustion of the air-fuel mixture that causes the piston 30 to slide is stopped, thereby causing the sliding piston 30 to gradually decelerate. When the piston 30 completely stops, a stoppage of the engine 10 is completed.

When the engine 10 is started from the state where the engine 10 is completely stopped, the piston 30 starts sliding from the stoppage position. Thus, torque to be used when starting the engine 10 varies depending on where the piston 30 is stopped.

Figure 3:
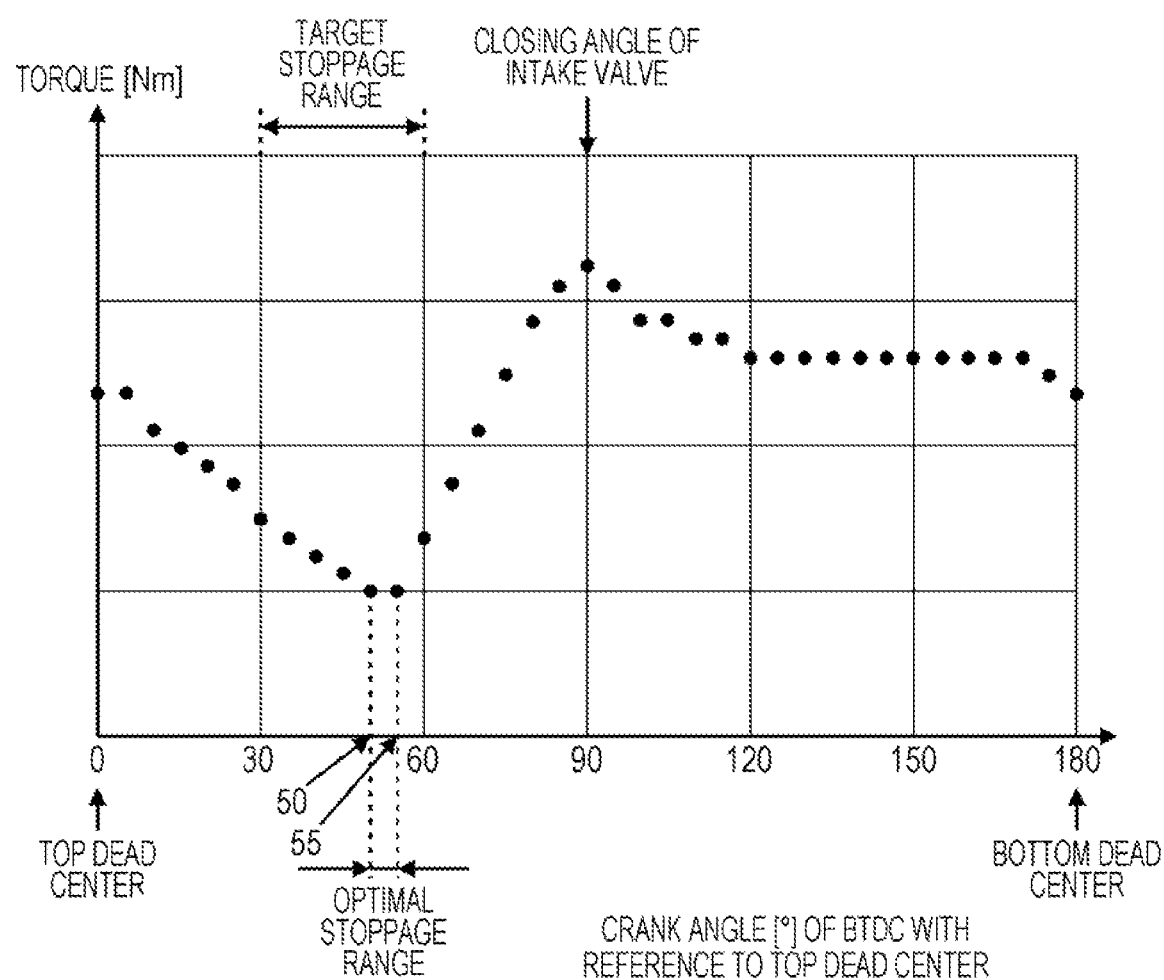
FIG. 3 illustrates an example of the relationship between a stoppage position of a piston and torque to be used when starting an engine.

FIG. 3 illustrates an example of the relationship between the stoppage position of the piston 30 and the torque to be used when starting the engine 10. The abscissa axis in FIG. 3 denotes a crank angle before the top dead center (BTDC) with reference to the top dead center and indicates the stoppage position of the piston 30. FIG. 3 illustrates a plotted example of the torque to be used when starting the engine 10 in a case where the stoppage position of the piston 30 is located at each of crank angles from 180° BTDC corresponding to the bottom dead center to 0° BTDC corresponding to the top dead center.

The top dead center in the example in FIG. 3 indicates the top dead center at the end of the compression stroke. Furthermore, in the example in FIG. 3, 90° BTDC corresponds to a crank angle at which the intake valve 38 is closed.

As illustrated in FIG. 3, the torques in the range from 90° BTDC to 0° BTDC are low altogether, as compared with the torques in the range from 180° BTDC to 90° BTDC. In one example, the torques in the range from 60° BTDC to 30° BTDC are lower than the torques in other ranges. In particular, the torques in the range from 55° BTDC to 50° BTDC are the lowest, as compared with the torques in other ranges. In detail, the torques in the range from 60° BTDC to 30° BTDC are less than 50% of the torque near 90° BTDC. In particular, the torques in the range from 55° BTDC to 50° BTDC are less than 30% of the torque near 90° BTDC, such that the torques in this range are significantly reduced.

The engine-stoppage controller 122 stops the piston 30 at a position where the crank angle is within a predetermined range from 60° BTDC to 30° BTDC.

Accordingly, the torque to be used when starting the engine 10 from a state where the piston 30 is stopped at the stoppage position can be reduced. As a result, the electric power consumed by the motor generator 12 driven for starting the engine 10 can be reduced, thereby suppressing a reduction in the state-of-charge (SOC) of the high-voltage battery 20 when the engine 10 is started. The SOC indicates a charge rate expressing a current charge capacity relative to a full charge capacity of a battery in percentage.

In some embodiments, the engine-stoppage controller 122 stops the piston 30 such that the crank angle is within the range from 55° BTDC to 50° BTDC.

Accordingly, the torque to be used when starting the engine 10 from a state where the piston 30 is stopped at the stoppage position can further be reduced. As a result, the electric power consumed by the motor generator 12 driven for starting the engine 10 can further be reduced, thereby further suppressing a reduction in the SOC of the high-voltage battery 20.

For the sake of convenience, the range of the crank angle from 60° BTDC to 30° BTDC may sometimes be referred to as a target stoppage range of the piston 30 hereinafter. Furthermore, the range of the crank angle from 55° BTDC to 50° BTDC may sometimes be referred to as an optimal stoppage range of the piston 30 hereinafter.

Accordingly, by stopping the piston 30 at a specific position within the target stoppage range, particularly, a specific position within the optimal stoppage range, a reduction in the SOC of the high-voltage battery 20 can be suppressed, thereby ultimately suppressing a reduction in the cruising distance of the vehicle 2.

The stoppage position of the piston 30 is set in accordance with the crank angle before the top dead center with reference to the top dead center at the end of the compression stroke. Alternatively, the stoppage position of the piston 30 may be set in accordance with the crank angle before the top dead center with reference to the top dead center at the end of the exhaust stroke. However, it is desirable that the stoppage position of the piston 30 be set in accordance with the crank angle before the top dead center with reference to the top dead center at the end of the compression stroke than be set in accordance with the crank angle before the top dead center with reference to the top dead center at the end of the exhaust stroke.

In the drive control system 1 according to this embodiment, the piston 30 is stopped at a specific position within the target stoppage range or the optimal stoppage range by using the electric turbocharger 70.

In one example, after transmitting the stoppage signal, the engine-stoppage controller 122 causes the electric turbocharger 70 to supply compressed air into the cylinder 32 until the stoppage of the engine 10 is completed. Accordingly, the engine-stoppage controller 122 stops the piston 30 at a position where the crank angle is within the predetermined range from 60° BTDC to 30° BTDC.

FIG. 4 is a timing chart explaining the flow of operation involving stopping and starting the engine 10. Time charts of the vehicle speed, the engine rotation speed, the state of the electric turbocharger 70, the electric power at the output terminal of the DC/DC converter 86, and the SOC of the high-voltage battery 20 share the same abscissa axis that denotes time. In the time chart of the SOC of the high-voltage battery 20, a solid line indicates this embodiment in which the electric turbocharger 70 performs exhaust recovery during an idling mode, whereas a single-dot chain line indicates a comparative example in which the electric turbocharger 70 does not perform exhaust recovery during an idling mode.

As illustrated in FIG. 4, the vehicle 2 is traveling at a fixed speed prior to a time point T1, and the engine 10 is driven and controlled at a first rotation speed. In this case, the electric turbocharger 70 is performing, for example, turbocharging operation. Moreover, the electric power at the output terminal of the DC/DC converter 86 is in a relatively high state, and the electric power of the high-voltage battery 20 is supplied to the electric turbocharger 70 via the DC/DC converter 86.

For example, it is assumed that the driver starts to reduce the accelerator operational amount at the time point T1, and the accelerator operational amount reaches substantially zero at a time point T2. Accordingly, the vehicle speed decreases in a period between the time point T1 and a time point T3. The engine rotation speed decreases with the decrease in the accelerator operational amount in a period between the time point T1 and the time point T2, and reaches a rotation speed corresponding to the idling mode from the time point T2 onward since the accelerator operational amount is substantially zero.

In the comparative example in which the electric turbocharger 70 does not perform exhaust recovery when the engine 10 is idling, the high-voltage battery 20 is recharged by recovery of the motor generator 12 in accordance with the decrease in the vehicle speed, and the SOC of the high-voltage battery 20 increases, as indicated with the single-dot chain line.

In contrast, the electric turbocharger 70 according to this embodiment stops performing the turbocharging operation due to the engine 10 switching to the idling mode at the time point T2 and starts performing exhaust recovery. The electric turbocharger 70 continuously executes the exhaust recovery in a period between the time point T2 and a time point T4. When the electric turbocharger 70 executes the exhaust recovery, electric power generated by the turbocharger motor 76 is supplied to the electrical device 84. Accordingly, an amount of electric power to be supplied from the high-voltage battery 20 to the electrical device 84 decreases, so that the electric power at the output terminal of the DC/DC converter 86 decreases.

Consequently, the electric power taken from the high-voltage battery 20 to the low-voltage electrical system via the DC/DC converter 86 is reduced, so that a reduction in the SOC of the high-voltage battery 20 is suppressed. In addition to the high-voltage battery 20 being recharged by the recovery of the motor generator 12, the electric power taken by the low-voltage electrical system is reduced, so that, as indicated with the solid line, the SOC of the high-voltage battery 20 relatively increases even further, as compared with the single-dot chain line indicating the comparative example.

It is assumed that the engine-stoppage controller 122 transmits a stoppage signal to the engine 10 at the time point T3. This causes the sliding piston 30 to gradually decelerate, and the engine rotation speed to thus decrease.

At the predetermined time point T4 within a period after the time point T3, serving as the transmission point of the stoppage signal, to a time point T5 at which a stoppage of the engine 10 is completed, the engine-stoppage controller 122 causes the electric turbocharger 70 to execute turbocharging operation to control the stoppage position of the piston 30. Thus, compressed air is delivered into the cylinder 32, and the piston 30 stops at a specific position within the target stoppage range or the optimal stoppage range at the time point 15.

When the electric turbocharger 70 executes the turbocharging operation at the time point T4, the electric power at the output terminal of the DC/DC converter 86 increases so as to supply the electric power from the high-voltage battery 20 to the electric turbocharger 70.

However, since the electric turbocharger 70 has executed the exhaust recovery during the idling mode of the engine 10, the SOC of the high-voltage battery 20 when the electric turbocharger 70 is caused to execute turbocharging operation for controlling the stoppage position of the piston 30 appears to have increased. Accordingly, even if the electric turbocharger 70 is caused to execute turbocharging operation for controlling the stoppage position of the piston 30, it appears as if the electric power preliminarily ensured by the exhaust recovery is used. Thus, by causing the electric turbocharger 70 to execute exhaust recovery when the engine 10 is idling, a reduction in the SOC of the high-voltage battery 20 can be comprehensively suppressed even if the electric turbocharger 70 is caused to execute turbocharging operation for controlling the stoppage position of the piston 30.

With the engine 10 being stopped from the time point T5 onward, the electric turbocharger 70 is in a stopped state. In this case, the electric power at the output terminal of the DC/DC converter 86 becomes an electric power according to the electric power consumed by the electrical device 84. The SOC of the high-voltage battery 20 decreases by an amount of electric power supplied from the high-voltage battery 20 to the electrical device 84 via the DC/DC converter 86.

It is assumed that the engine 10 is restarted at a time point T6 after the time point T5. When the engine 10 is restarted, the piston 30 starts to slide from the stopped state at the specific position within the target stoppage range or the optimal stoppage range. At this specific position, the torque used for starting the engine 10 is smaller than the torque at other positions. Therefore, the electric power consumed by the motor generator 12 for restarting the engine 10 can be reduced.

The restarting of the engine 10 causes the engine rotation speed to increase from zero. It is assumed that, from a time point T7 onward, the accelerator operational amount increases from zero and the vehicle speed increases. With the accelerator operational amount increasing from zero, the electric turbocharger 70 starts to execute turbocharging operation. The electric power at the output terminal of the DC/DC converter 86 increases by an amount of electric power supplied from the high-voltage battery 20 to the electric turbocharger 70.

Next, specific control of the electric turbocharger 70 for controlling the stoppage position of the piston 30 will be described. The engine-stoppage controller 122 controls the electric turbocharger 70 by using the turbocharging-operation condition map 102 preliminarily stored in the storage device 100, so as to control the stoppage position of the piston 30.

FIG. 5 illustrates an example of the turbocharging-operation condition map 102. In the turbocharging-operation condition map 102, the engine rotation speed, the oil temperature, and a turbocharging-operation condition are associated with one another. Examples of the turbocharging-operation condition include a turbocharging start timing, a turbocharging duration, and an output of the electric turbocharger 70. In one example, in the turbocharging-operation condition map 102, a turbocharging start timing, a turbocharging duration, and an output of the electric turbocharger 70 are set for each combination of the engine rotation speed and the oil temperature.

The turbocharging start timing in the turbocharging-operation condition map 102 indicates a timing for causing the turbocharger motor 76 to start executing turbocharging operation within a period from when a stoppage signal is transmitted to when a stoppage of the engine 10 is completed. In other words, the turbocharging start timing indicates a start timing for the supplying of compressed air to the cylinder 32. The turbocharging start timing is defined in accordance with a time period from when the stoppage signal is transmitted to the engine 10 to when the turbocharger motor 76 starts executing the turbocharging operation.

The turbocharging duration in the turbocharging-operation condition map 102 indicates a time period in which the turbocharger motor 76 continues to execute the turbocharging operation within the period from when the stoppage signal is transmitted to when the stoppage of the engine 10 is completed. In other words, the turbocharging duration indicates the duration of the supplying of the compressed air.

The output of the electric turbocharger 70 in the turbocharging-operation condition map 102 indicates the output of the electric turbocharger 70 when the turbocharger motor 76 executes the turbocharging operation within the period from when the stoppage signal is transmitted to when the stoppage of the engine 10 is completed. The output of the electric turbocharger 70 corresponds to an amount of compressed air supplied into the cylinder 32.

The higher the engine rotation speed, the longer the time it takes to complete the stoppage of the engine 10 from when the stoppage signal is transmitted to the engine 10. Thus, in the turbocharging-operation condition map 102, the turbocharging start timing may be set to be relatively later with increasing engine rotation speed. Furthermore, the higher the engine rotation speed, the greater the force by which the piston 30 slides due to inertia. Thus, in the turbocharging-operation condition map 102, the turbocharging duration may be set to be relatively longer with increasing engine rotation speed such that the compressed air moves against the inertia of the piston 30. In the turbocharging-operation condition map 102, the output of the electric turbocharger 70 may be set to be relatively higher with increasing engine rotation speed such that the compressed air moves against the inertia of the piston 30.

Furthermore, the lower the oil temperature, the higher the viscosity of oil, resulting in larger friction against the sliding of the piston 30. When the friction against the sliding of the piston 30 is large, the time it takes to complete the stoppage of the engine 10 from when the stoppage signal is transmitted to the engine 10 becomes shorter. Thus, in the turbocharging-operation condition map 102, the turbocharging start timing may be set to be relatively earlier with decreasing oil temperature. Moreover, when the friction against the sliding of the piston 30 is large, the force by which the piston 30 slides due to inertia tends to be suppressed by the friction. Thus, in the turbocharging-operation condition map 102, the turbocharging duration may be set to be relatively shorter since the time in which the compressed air moves against the inertia of the piston 30 may be shorter with decreasing oil temperature. In the turbocharging-operation condition map 102, the output of the electric turbocharger 70 may be set to be relatively lower with decreasing oil temperature since the force by which the compressed air moves against the inertia of the piston 30 may be smaller.

The engine-stoppage controller 122 determines the turbocharging-operation condition of the electric turbocharger 70 for performing stoppage control of the piston 30 based on the engine rotation speed and the oil temperature at the transmission timing of the stoppage signal and also based on the turbocharging-operation condition map 102 stored in the storage device 100. For example, the engine-stoppage controller 122 applies the engine rotation speed and the oil temperature at the transmission timing of the stoppage signal to the turbocharging-operation condition map 102, so as to determine the turbocharging start timing, the turbocharging duration, and the output of the electric turbocharger 70. The engine-stoppage controller 122 causes the electric turbocharger 70 to perform turbocharging operation in accordance with the determined turbocharging-operation condition, thereby stopping the piston 30 at a specific position before the top dead center.

In the example described above, the turbocharging-operation condition is determined based on the engine rotation speed and the oil temperature. Alternatively, the engine-stoppage controller 122 may omit the oil-temperature condition and determine the turbocharging-operation condition based on the engine rotation speed. In that case, in the turbocharging-operation condition map 102, the oil-temperature condition may be omitted, and the engine rotation speed and the turbocharging-operation condition may be associated with each other.

Figure 6:
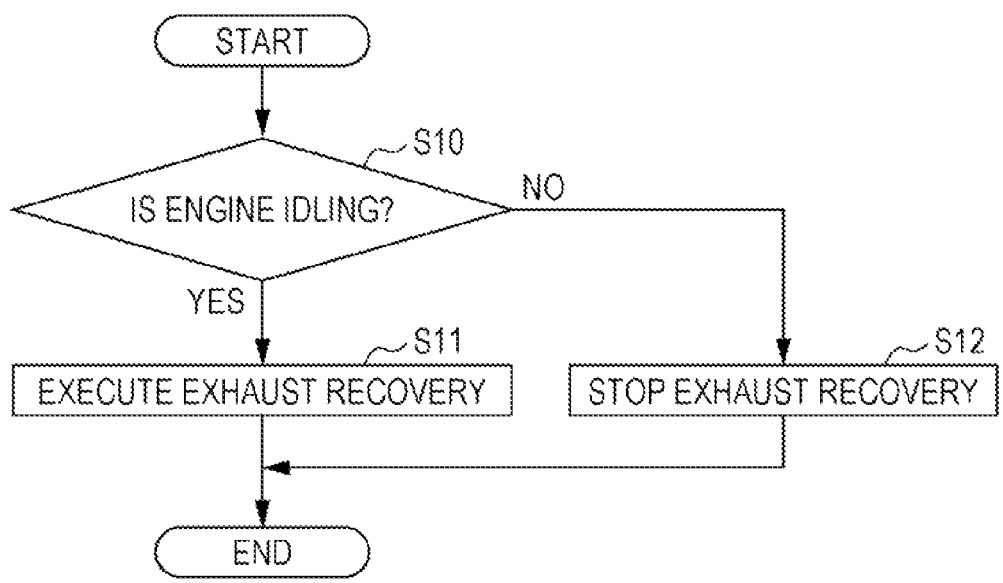
FIG. 6 is a flowchart explaining the flow of operation performed by an exhaust-recovery controller.

FIG. 6 is a flowchart explaining the flow of operation performed by the exhaust-recovery controller 120. The exhaust-recovery controller 120 repeatedly executes the series of processing in FIG. 6 every time a predetermined interrupt timing is reached during a predetermined cycle.

When the predetermined interrupt timing is reached, the exhaust-recovery controller 120 determines in step S10 whether the engine 10 is idling. For example, if the engine 10 is being driven and an accelerator operational amount detected by the accelerator-pedal sensor 90 is substantially zero, the exhaust-recovery controller 120 determines that the engine 10 is idling.

If it is determined that the engine 10 is idling (YES in step S10), the exhaust-recovery controller 120 causes the turbocharger motor 76 to execute exhaust recovery in step S11, and ends the current processing.

If it is determined that the engine 10 is not idling (NO in step S10), the exhaust-recovery controller 120 causes the turbocharger motor 76 to stop the exhaust recovery in step S12, and ends the current processing.

FIG. 7 is a flowchart explaining the flow of operation performed by the engine-stoppage controller 122. The engine-stoppage controller 122 waits until the stoppage condition is satisfied (NO in step S20). When the stoppage condition is satisfied (YES in step S20), the engine-stoppage controller 122 executes step S21 and onward.

In step S21, the engine-stoppage controller 122 acquires a current engine rotation speed detected by the engine-rotation-speed sensor 92. Since a stoppage signal is to be transmitted in step S24 to be described later, the engine rotation speed acquired in step S21 corresponds to an engine rotation speed at the transmission timing of the stoppage signal.

Subsequently, in step S22, the engine-stoppage controller 122 acquires a current oil temperature detected by the oil-temperature sensor 96. Since the stoppage signal is to be transmitted in step S24 to be described later, the oil temperature acquired in step S22 corresponds to an oil temperature at the transmission timing of the stoppage signal.

Then, in step S23, the engine-stoppage controller 122 determines the turbocharging-operation condition based on the acquired current engine rotation speed, the acquired current oil temperature, and the turbocharging-operation condition map 102. Accordingly, the turbocharging start timing, the turbocharging duration, and the output of the electric turbocharger 70 included in the turbocharging-operation condition are determined.

Subsequently, in step S24, the engine-stoppage controller 122 transmits the stoppage signal to the engine 10. Although not illustrated in FIG. 7, the engine-stoppage controller 122 starts to measure the time elapsed from the transmission of the stoppage signal.

Then, in step S25, the engine-stoppage controller 122 determines whether the turbocharging start timing is reached. For example, if the time elapsed from the transmission of the stoppage signal reaches the time indicated by the turbocharging start timing of the turbocharging-operation condition, the engine-stoppage controller 122 determines that the turbocharging start timing is reached. The engine-stoppage controller 122 waits until the turbocharging start timing is reached (NO in step S25).

When it is determined that the turbocharging start timing is reached (YES in step S25), the engine-stoppage controller 122 causes the turbocharger motor 76 to execute turbocharging operation in step S26. In this case, the engine-stoppage controller 122 drives the turbocharger motor 76 such that the output of the electric turbocharger 70 becomes equal to the output determined as the turbocharging-operation condition. Although not illustrated in FIG. 7, the engine-stoppage controller 122 starts to measure the time elapsed from the start of the turbocharging operation.

Subsequently, in step S27, the engine-stoppage controller 122 determines whether a turbocharging time has elapsed. For example, if the time elapsed from the start of the turbocharging operation reaches the turbocharging duration of the turbocharging-operation condition, the engine-stoppage controller 122 determines that the turbocharging time has elapsed. The engine-stoppage controller 122 waits until the turbocharging time elapses (NO in step S27).

When it is determined that the turbocharging time has elapsed (YES in step S27), the engine-stoppage controller 122 causes the turbocharger motor 76 to stop the turbocharging operation in step S28, and ends the series of processing.

Accordingly, in the drive control system 1 according to this embodiment, the electric turbocharger 70 supplies compressed air into the cylinder 32 in a period from when a stoppage signal is transmitted to when a stoppage of the engine 10 is completed, so that the piston 30 is stopped at a position where the crank angle is within the predetermined range from 60° BTDC to 30° BTDC.

Accordingly, in the drive control system 1 according to this embodiment, the engine 10 can be started in a state where the piston 30 is stopped at an appropriate position where the torque to be used for starting the engine 10 is small. For example, if the piston 30 is stopped near the bottom dead center, the torque to be used for starting the engine 10 increases, as illustrated in FIG. 3. However, in the drive control system 1 according to this embodiment, the piston 30 is stopped at a position where the crank angle is within the predetermined range from 60° BTDC to 30° BTDC, so that the torque to be used for starting the engine 10 can be reduced. Consequently, in the drive control system 1 according to this embodiment, the electric power consumed by the motor generator 12 for starting the engine 10 can be reduced.

Therefore, in the drive control system 1 according to this embodiment, power consumption for starting the engine 10 can be reduced. Moreover, for example, when the engine 10 is to be started in the drive control system 1 according to this embodiment, the engine 10 is to be started without moving the piston 30 to an appropriate position, so that the power consumption for starting the engine 10 can be reduced.

Furthermore, in the drive control system 1 according to this embodiment, the aforementioned predetermined range is set such that the crank angle ranges from 55° BTDC to 50° BTDC. Accordingly, in the drive control system 1 according to this embodiment, the power consumption for starting the engine 10 can be further reduced.

Furthermore, in the drive control system 1 according to this embodiment, exhaust recovery is executed by the turbocharger motor 76 while the engine 10 is idling. Moreover, in the drive control system 1 according to this embodiment, the turbocharger motor 76 is caused to execute turbocharging operation at a predetermined timing after a stoppage signal is transmitted, so that compressed air is supplied into the cylinder 32, whereby the piston 30 is stopped at a position where the crank angle is within the predetermined range. Consequently, in the drive control system 1 according to this embodiment, the electric power used for causing the turbocharger motor 76 to execute the turbocharging operation can be preliminarily ensured by exhaust recovery. Thus, even if the turbocharger motor 76 is to execute turbocharging operation, an increase in power consumption can be comprehensively suppressed.

Furthermore, in the drive control system 1 according to this embodiment, the start timing for the supplying of compressed air to the cylinder 32, the duration of the supplying of the compressed air, and the amount of compressed air to be supplied are determined based on the rotation speed of the engine 10 at the transmission timing of the stoppage signal. Consequently, in the drive control system 1 according to this embodiment, the piston 30 can be properly stopped at an appropriate position in accordance with the turbocharging operation of the electric turbocharger 70.

Although the embodiment of the disclosure has been described above with reference to the appended drawings, the embodiment of the disclosure is not to be limited thereto. It is apparent to a skilled person that various modifications and alterations are conceivable within the scope defined in the claims, and it is to be understood that such modifications and alterations naturally belong to the technical scope of the embodiment of the disclosure.

The drive control system 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the drive control system 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM.

The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A drive control system comprising:
   an engine comprising a cylinder and a piston provided in a slidable manner inside the cylinder, the engine being configured to rotate a crankshaft in accordance with sliding of the piston;
   an electric turbocharger configured to supply compressed air into the cylinder; and
   a controller comprising:
      at least one processor; and
      at least one memory coupled to the at least one processor, and
   wherein the at least one memory stores a turbocharging-condition map including turbocharging-operation conditions, each of which (1) specifies a turbocharging start timing, a turbocharging duration, and an output of the electric turbocharger, and (2) is associated with a corresponding pair of engine rotation speed and oil temperature of lubricating oil of the engine, and
   wherein the at least one processor is configured to:
      determine that a stoppage condition is met;
      acquire engine rotation speed and oil temperature in response to determining that the stoppage condition is met;
      identify one of the turbocharging operation conditions based on the acquired engine rotation speed and oil temperature to acquire the turbocharging start timing, the turbocharging duration, and the output of the electric turbocharger specified in the identified one of the turbocharging operation conditions;
      transmit a stoppage signal for stopping the engine to the engine;
      start a turbocharging operation based on the specified turbocharging start timing, after the stoppage signal is transmitted to the engine; and
      execute the turbocharging operation to control the turbocharger to supply the compressed air to the cylinder based on the specified output of the electric turbocharger for the specified turbocharging duration such that the piston stops at a position where a crank angle is within a predetermined range from 60° before a top dead center to 30° before the top dead center.

2. The drive control system according to claim 1, wherein the predetermined range is a range in which the crank angle is from 55° before the top dead center to 50° before the top dead center.

3. The drive control system according to claim 1, wherein the electric turbocharger comprises:
   an intake turbine provided in an intake channel of the engine;
   an exhaust turbine provided in an exhaust channel of the engine; and
   a turbocharger motor configured to execute turbocharging operation involving generating the compressed air by driving the intake turbine and to execute exhaust recovery involving converting rotational energy of the exhaust turbine into electrical energy,
   wherein the at least one processor is configured to:
      cause the turbocharger motor to execute the exhaust recovery while the engine is idling; and
      cause the turbocharger motor to execute the turbocharging operation at a predetermined timing after the stoppage signal is transmitted and supplying the compressed air into the cylinder so as to stop the piston at the position where the crank angle is within the predetermined range.

4. The drive control system according to claim 2, wherein the electric turbocharger comprises:
   an intake turbine provided in an intake channel of the engine;
   an exhaust turbine provided in an exhaust channel of the engine; and
   a turbocharger motor configured to execute turbocharging operation involving generating the compressed air by driving the intake turbine and to execute exhaust recovery involving converting rotational energy of the exhaust turbine into electrical energy,
   wherein the process further comprises:
      causing the turbocharger motor to execute the exhaust recovery while the engine is idling; and
      causing the turbocharger motor to execute the turbocharging operation at a predetermined timing after the stoppage signal is transmitted and supplying the compressed air into the cylinder so as to stop the piston at the position where the crank angle is within the predetermined range.

5. The drive control system according to claim 1, wherein the process further comprises:
   determining a start timing for supplying the compressed air to the cylinder, a duration of supplying the compressed air, and an amount of the compressed air to be supplied, based on a rotation speed of the engine at a timing when the stoppage signal is transmitted.

6. The drive control system according to claim 2, wherein the process further comprises:
   determining a start timing for supplying the compressed air to the cylinder, a duration of supplying the compressed air, and an amount of the compressed air to be supplied, based on a rotation speed of the engine at a timing when the stoppage signal is transmitted.

7. The drive control system according to claim 1, wherein the electric turbocharger is configured to include:
   an intake turbine provided in an intake channel of the engine;
   an exhaust turbine provided in an exhaust channel of the engine; and
   a turbocharger motor configured to execute turbocharging operation involving generating the compressed air by driving the intake turbine and to execute exhaust recovery involving converting rotational energy of the exhaust turbine into first electrical energy, and
   wherein the first electrical energy is supplied to electrical devices included in a vehicle in which the drive control system is installed.

* * * * *